United States Patent [19]
Good et al.

[11] 3,800,997
[45] Apr. 2, 1974

[54] CABLE WELDING TOOL

[75] Inventors: William E. Good, Cinnaminson; Arthur S. Davies, Avalon, both of N.J.

[73] Assignee: Kelsey-Hayes Company, Romulus, Mich.

[22] Filed: Jan. 12, 1972

[21] Appl. No.: 217,096

[52] U.S. Cl. ...................... 228/3, 29/470.1, 140/113
[51] Int. Cl. ............................................. B23k 21/00
[58] Field of Search ......... 228/3, 4, 5, 44; 29/470.1, 29/464; 140/113; 81/352

[56] References Cited
UNITED STATES PATENTS

| | | | |
|---|---|---|---|
| 2,715,345 | 8/1955 | Rozmus | 228/3 |
| 2,772,715 | 12/1956 | Neijstrom et al. | 140/113 X |
| 2,863,344 | 12/1958 | Barnes | 228/3 |
| 2,920,511 | 1/1960 | Johnson | 228/3 |
| 3,044,328 | 7/1962 | Zysk | 228/3 |

Primary Examiner—J. Spencer Overholser
Assistant Examiner—Robert J. Craig
Attorney, Agent, or Firm—Harness, Dickey & Pierce

[57] ABSTRACT

A tool for cold pressure welding workpieces such as coaxial cables together. The tool has a compact arrangement so that it may be hand held and operated. A hydraulic pump and motor are incorporated for providing a force amplification which lends to the compactness and light weight of the assembly. The hydraulic motor operates pairs of dies which dies first grip the ends of the workpieces to be welded and then force these ends into engagement to achieve a cold pressure weld. A pressure relief valve is interposed in the hydraulic circuit for limiting the force applied to the dies. The dies are held in pivotally supported parts of the tool so that the tool may be conveniently opened for inspection, replacement or cleaning of the dies.

24 Claims, 7 Drawing Figures

CABLE WELDING TOOL

BACKGROUND OF THE INVENTION

This invention relates to an improved pressure welding apparatus and more particularly to an improved cable welding tool.

The advantages of cold pressure welding are well known in the art. Various machines and mechanisms have been provided for accomplishing cold pressure welds, particularly for cold welding wires. Because of the fact that pressure rather than heat is used to achieve the welding upset, the tool must generate very high forces. For this reason, the cold welding tools that have been previously proposed are relatively large and heavy machines. Although there have been proposed relatively small machines, these machines have been limited to applications in which extremely fine wires were welded and even then the tools were bench operated.

Recently, a need has been found for achieving good splices in coaxial cables. The signal transmitted via coaxial cables will experience spurious reflections and/or signal deterioration if the splices change the diameter of the conductor. Furthermore, conventional cable splices that depend upon soldered connections, slip fit parts or compression fittings may pull apart and create open circuits when subjected to thermal cycling or mechanical stresses. The splicing of coaxial cables, therefore, offers an excellent opportunity for the application of cold pressure welding. Cold pressure welding provides a superior electrical connection with no significant change in the wire diameter. The strength of cold pressure welds also is comparable to the strength of unspliced conductors.

Often times, these cables are carried by overhead poles. Because such splices must be made in the field and at times at the top of a utility pole, the previously proposed cold welding machines cannot be used due to their aforenoted defects as to size.

It is, therefore, a principal object of this invention to provide an improved and compact cold pressure welding tool.

It is another object of this invention to provide a hand held tool that is adapted for use in cold pressure welding of such parts as coaxial cables.

It is a further object of the invention to provide a compact cold pressure welding tool embodying an efficient force amplifier.

In connection with achieving a compact tool that is light in weight and which nevertheless incorporates a force amplification mechanism, the use of a hydraulic device for force amplification offers many advantages.

It is therefore, another object of this invention to provide a hydraulically operated cold pressure welding apparatus that has a compact construction.

Cold welding tools normally include pairs of dies that drip and upset the workpieces. These dies must be supported for movement in accurately defined paths so as to insure good pressure welds. In order to so support the dies it has been the practice to mount the dies in a rigid housing. However, cold pressure welding results in the formation of an upset or flash area around the weld joint. Frequently, this flash will become dislodged from the weld workpieces and jammed between the dies. It is, therefore, necessary to disassemble the apparatus to permit cleaning of the dies and to inspect the dies machined surfaces.

It is, therefore, still another object of this invention to provide a cold pressure welding tool in which the welding dies may be conveniently inspected, cleaned and replaced.

It is another object of the invention to provide a cold pressure welding tool having a housing made up of two pivotally supported members each of which supports a portion of the die assembly for facilitating cleaning and removal of the dies.

As has been previously noted, most cold pressure welding tools employ two pairs of dies which dies move relative to each other to both grip and upset the workpiece. It is necessary to incorporate a mechanism for moving the dies in a predetermined sequence. Furthermore, it is necessary to accurately locate the dies relative to each other.

It is yet a further object of this invention to provide an improved cold pressure welding apparatus incorporating an improved arrangement for achieving the sequencing operation of the dies.

It is still a further object of this invention to provide an improvde cold pressure welding apparatus in which the die location is simplified.

In cold pressure welding, the pieces to be welded are normally gripped by welding dies which dies are moved toward and away from each other to achieve an upset of the ends of the pieces. Because the weld is generated by the application of pressure without heat, considerable forces are required to achieve the weld. It is desirable, because of the force experienced, to provide some mechanism that limited the force applied to the welded pieces and to the welding dies to prevent damage.

It is, therefore, yet another feature of this invention, to provide an improved cold pressure welding apparatus that incorporates a device for limiting the forces applied to the workpieces and to the welding dies.

SUMMARY OF THE INVENTION

The first feature of this invention is adapted to be embodied in a hand held tool for cold pressure welding of pieces. The tool includes a housing assembly that is adapted to be held in the hand of an operator. A handle is supported for movement relative to the housing assembly and is adapted to be manually moved relative to the housing assembly. Carried by the housing assembly are welding dies that are adapted to grip and upset pieces to be welded. Force amplifying means are carried by the housing assembly and are operatively interposed between the handle and the welding dies for amplifying a manual force applied to the handle and for using the amplified force for moving the welding dies through a welding sequence.

Another feature of the invention is adapted to be embodied in a cold pressure welding tool. Such a tool comprises first and second die means and first and second housing members each of which supports a respective one of the die means. Means are provided for moving the die means into gripping engagement with first and second pieces to be welded and for movement to upset the ends of the gripped pieces. Means pivotally connect the housing members together for movement from a closed position in which the die means coact to effect an upset and an opened position in which the die means may be readily inspected and removed from their respective supporting housing members.

Yet another feature of the invention is also adapted to be embodied in a cold pressure welding apparatus. Such an apparatus includes first, second, third and fourth dies. The first cam is juxtaposed to the first and third dies and has means for urging the first and third dies toward each other upon movement of the first cam relative to the first and third dies. A second cam is juxtaposed to the second and fourth dies and has means for urging these dies toward each other upon movement of the second cam relative to the second and fourth dies. A spring biased third cam is interposed between the first and third dies for urging these dies away from each other. A spring biased fourth cam is interposed between the second and fourth dies for urging these dies away from each other. Means are provided for moving the first and second cams relative to their associated dies and toward each other for operating the dies. The spring biased cams serve to cause initial movement of the first and second dies and of the third and fourth dies relative to each other. Upon continued movement of the first and second cams, the spring biased cams yield and the first and second dies move toward the third and fourth dies.

A further feature of this invention also is adapted to be embodied in a cold welding apparatus. The apparatus comprises first and second die means for gripping respective workpieces. Force applying means are incorporated for moving the die means relative to each other between opened and welding positions for effecting an upset on the ends of the pieces held by the die means. Overload release means limit the force applied to the die means by the force applying means to a predetermined value.

BRIEF DESCRIPTION OF THE DRAWINGS

FIG. 3 is a cross sectional view taken along the line 3—3 of FIG. 2.

DETAILED DESCRIPTION OF THE PREFERRED EMBODIMENT

A cold pressure welding tool embodying this invention is identified by the reference numeral 11. The tool 11 is, as will become more apparent as this description proceeds, relatively light in weight and yet is capable of exerting extremely high welding pressures. Because of these characteristics, the tool 11 is particularly adapted for hand operation and is useful in the welding of coaxial cables. This latter welding operation may be performed at the top of a utility pole.

The tool 11 is comprised of a main body assembly or housing 12. A handle 13 is pivotally supported at one end of the housing assembly by means of a pivot pin 14 that is held in place axially by snap rings 15. As will become more apparent, the handle 13 when pivoted operates a hydraulic pump 16 which, in turn, feeds pressurized hydraulic fluid to a fluid motor 17 for effecting welding operation of the die set 18. Thus, a hydraulic force amplification is provided between the handle 13 and the die set 18.

Figure 4:
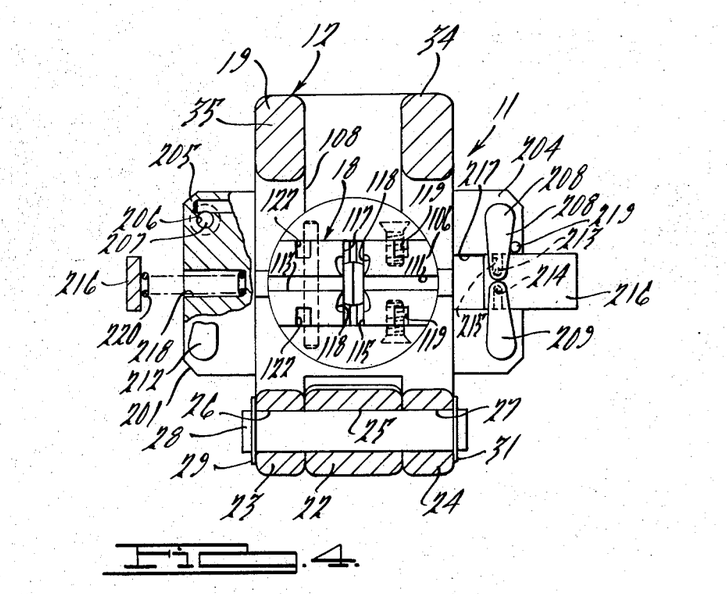
FIG. 4 is a cross sectional view taken along the line 4—4 of FIG. 2.

The housing assembly 12 is comprised of a pair of generally cylindrically shaped housing members 19 and 21. The housing member 21 is formed with a boss 22 that is nested between a pair of bosses 23 and 24 of the housing member 19 (FIG. 4). The housing member bosses 22, 23 and 24 are formed with aligned bores 25, 26 and 27, respectively. A pin 28 extends through the bores 25, 26 and 27 to pivotally connect the housing members 19 and 21 together. Snap rings 29 and 31 are received on opposite ends of the pin 28 to axially locate this pin.

The housing members 19 and 21 are held in a closed position (as shown in Figures of the drawings) by a latch mechanism, indicated generally by the reference numeral 32. The latch mechanism 32 includes a latching member 33 that is pivotally supported between a pair of outwardly extending arms 34 and 35 of the housing member 19. This pivotal support is provided by means of a pivot pin 36 that extends through a bore 37 in the latching member 33 and through corresponding bores in the arms 34 and 35. The pivot pin 36 is held axially in place by snap rings 38.

The latching member 33 is pivotable between a latched position as shown in the drawings and a released position. In the latched position the latching member 33 engages a shoulder 39 formed on an extending portion 41 of the housing member 21. This engagement retains the members 19 and 21 in their closed position. If it is desired to open the housing members 19 and 21, for a reason which will become more apparent as this description proceeds, the latching member 33 is pivoted to a released position free of the shoulder 39. The housing member 19 may then be pivoted relative to the housing member 21 about the pivot pin 28. A dowel 42 extends through a bore in the housing member portion 22 and is engaged by the portions 23 and 24 of the housing member 19 to limit the degree of opening movement.

The housing assembly 12 further includes a pump housing 43 that is spaced from the housing member 21. A pair of sheet metal stiffeners 44 and 45 are held together by socket headed screws 46 and span the area from the pump housing 43 to the housing member 21. The stiffeners 44 and 45 aid in connecting the pump housing 43 to the housing member 21.

A bore 47 is formed in the pump housing 43 and extends generally perpendicularly to the axis of the handle pivot pin 14. The bore 47 does not, however, intersect this axia. A piston 48 is slidably supported in the bore 47. Adjacent the outer end of the piston 48, the bore 47 is formed with a counterbore 49 in which a seal 51 is received. Immediately adjacent this seal a plug 52 is threaded into a tapped opening 53 of the pump housing 43 to engage and compress the seal 51. The plug 52 is formed with a bore through which the piston 48 extends. The upper end of the piston 48 is formed with an enlarged lug 54 in which a bore 55 is formed. This lug 54 extends through a central opening in the handle assembly 13 adjacent the pivot pin 14. A pivot pin 56 extends through the bore 55 and through a pair of elongated slots 57 formed in the handle assembly 13. Snap rings 58 axially position the pin 56. It should be noted that pivotal movement of the handle assembly 13 about the pivot pin 14 will cause reciprocation of the piston 48 in the bore 47. If desired, an adjustable stop screw 59 may be threaded through a female threaded opening 61 in the handle assembly 13 adjacent the pivot pin 14. A stop screw 59 will engage the pump housing 43 and limit the degree of pivotal movement of the handle assembly 13 during the outward stroke of the piston 48. A lock nut 62 holds the adjusting screw 59 in position.

A bore 63 intersects a reduced diameter bore 64 formed at the lower end of the bore 47. Adjacent the intersection of the bores 63 and 64, a conically shaped valve seat 65 is formed. The valve seat 65 is formed at the base of a larger diameter bore 66 which is, in turn, counterbored at 67. A tension screw 68 is received within the counter bore 67 and has an opening 69 that permits the flow of hydraulic fluid through this screw. The tension screw 68 engages a coil spring 71 which bears against a ball check valve 72 to urge this check valve into engagement with the seat 65.

A tube 70 has fittings 73 and 74 at its opposite ends. The fitting 73 affords a fluid connection between the interior of the tube 72 and the bore 66. The opposite end of the tube 70 is in communication with a bore 75 formed in the housing member 21 by means of the fitting 74.

The bore 75 intersects a larger diameter bore 76 formed in the housing member 21. A piston 77, which will be described in more detail as this description proceeds, is slidably supported in the bore 76. The bore 75 is intersected by a pair of bores 78 and 79. A pressure relief valve, indicated generally by the reference numeral 81 is provided in the bore 78. The pressure relief valve 81 includes a valve member 82 that coacts with a seat 83 to control the flow through the bore 78. A coil spring 84 engages the valve member 82 and urges it toward a closed position. An adjusting plug 85 is received in a threaded opening 86 formed at the outer end of the bore 78 and engages the spring 84. The adjusting plug 85 may be suitably positioned so as to adjust the preload on the spring 84 and the pressure at which the valve 81 opens. Preferably, the head of the valve member 82 that engages the seat 83 is capable of transverse movement so that good seating will be effected without necessitating extremely close fits.

When the pressure relief valve 81 is opened flow is permitted from the bore 78 through a transversely extending bore 87 into a large diameter reservoir tube 88. The reservoir tube 88 is positioned between the housing member and the pump housing 43. O-ring seals 89 and 91 are provided at opposite ends of the reservoir tube 88 to assure good sealing with the housing member 21 and pump housing 43, respectively. At the pump housing 43 the reservoir tube 88 communicates with a bore 92 which bore, in turn, terminates at a smaller diameter bore 93 that intersects the piston bore 47. At one extreme end of the stroke of the piston 48, the bore 93 is in communication with the bore 47. At other positions of the piston 48, this piston blocks the communication between the bore 93 and the bore 47.

The passage 87 intersects the check valve 81 and has a portion 94 that extends beyond this point of intersection and which, in turn, intersects the passage 79. A release valve assembly, indicated generally by the reference numeral 95 has a valve member 96 that engages a seat 97 formed adjacent the intersection of the passage 79 with the passage 75. The valve member 96 is engaged by a stem 98 of a release knob 99 for holding the valve member 96 in position. The valve member 96 is, however, free to shift transversely relative to the stem 96 so as to seek a centralized location within the valve seat 97. As has been noted in connection with the construction of the relief valve 81, this free floating relationship permits good sealing at a low cost. The knob 99 has a threaded shank 101 that is received in a tapped opening 102 in the housing member 21.

Figure 2:
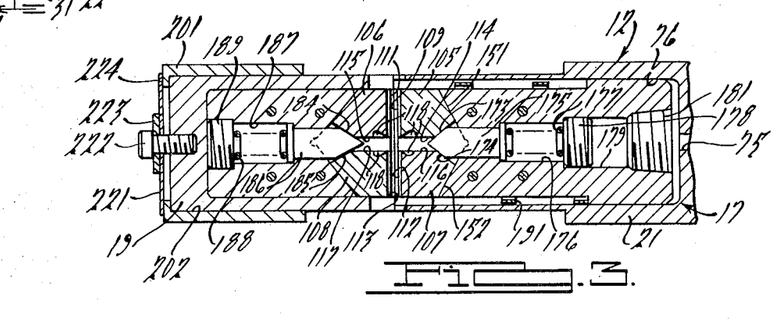
FIG. 2 is an enlarged longitudinal cross sectional view of the tool shown in FIG. 1.

Before proceeding to a description of the method in which the die set 18 functions, a brief description of the operation of the hydraulic pump 16 and motor assembly 17 is in order. FIG. 2 of the drawings illustrates the mechanism at the completion of a stroke of the pump 16. In order to initiate the next pumping operation, the handle 13 is pivoted in a clockwise direction about the pivot pin 14 to slide the piston 48 in the bore 47. During this movement, the check valve 72 will preclude the return flow of fluid into the bore 47 from the passage 66. Some fluid may leak into the area of the bore 48 opened by the return of the piston 47 through the passage 93 past the piston. When the piston 48 has been withdrawn sufficiently to expose the end of the passage 93 the bore 47 will be completely filled with fluid, this fluid having come from the reservoir tube 88. The piston 48 is then driven down into the bore 47 by reverse movement of the handle assembly 13. The reservoir passage 93 will then be closed and fluid will be forced past the check valve 72 through the tube 70 into the passage 75. This fluid then flows into the bore 76 to act on the piston 77 to accomplish operation of the die set 18, as will become more apparent. If too high a pressure is developed, the relief valve 81 will open and permit flow back into the reservoir 88. Also, when it is desired to return the die 18 to a fully opened position the release valve 95 is turned so that the pressure can act upon the release valve member 96 to open it and permit fluid to return to the reservoir tube 88.

Figure 5:
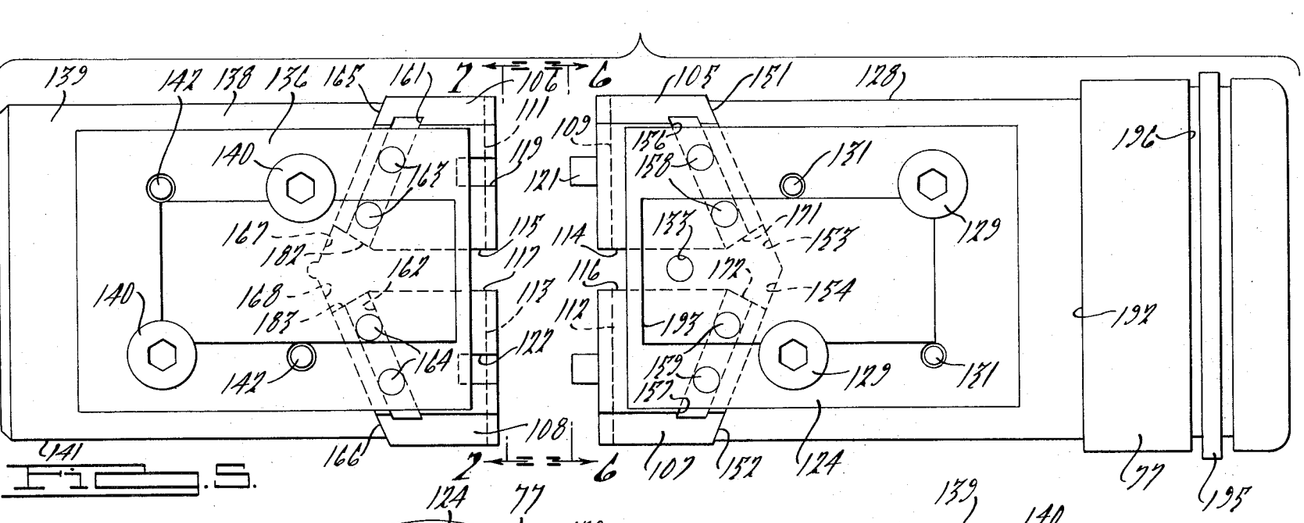
FIG. 5 is an enlarged view taken generally in the direction of the line 5—5 of FIG. 2.

The die assembly 18 is best shown in FIG. 5 and is comprised of a first pair of dies 105 and 106 and a second pair of dies 107 and 108 (FIG. 3). The dies 105 and 106 have mating surfaces in which grooves 109 and 111 are formed. The grooves 109 and 111 are adapted to form a cavity in which a wire (not shown) is gripped when the mating faces of the dies 105 and 106 are in engagement. In a like manner, the dies 107 and 108 are formed with grooves 112 and 113, respectively, for forming a wire or cable receiving cavity. The dies 105 and 106 have surfaces 114 and 115 which face corresponding surfaces 116 and 117 of the dies 107 and 108. Flash receiving cavities 118 are formed in each of the surfaces 114, 115, 116 and 117, for a reason which will become well apparent as this description proceeds.

The upper and lower surfaces of the die 106 are provided with intermediate angularly shaped recesses 119. The die 105 is formed with complementary shaped projections 121 that are adapted to extend into the recesses 119 to locate the die 105 with resepct to the die 106 in a direction parallel to the axis of the wire that is received in the grooves 109 and 111. The construction, however, permits movement of the dies 105 and 106 toward and away from each other. In a like manner, the die 108 is formed with recesses 122 into which complementary extensions 123 of the die 107 extend to provide axial location of these dies relative to each other.

Figures 6, 7:
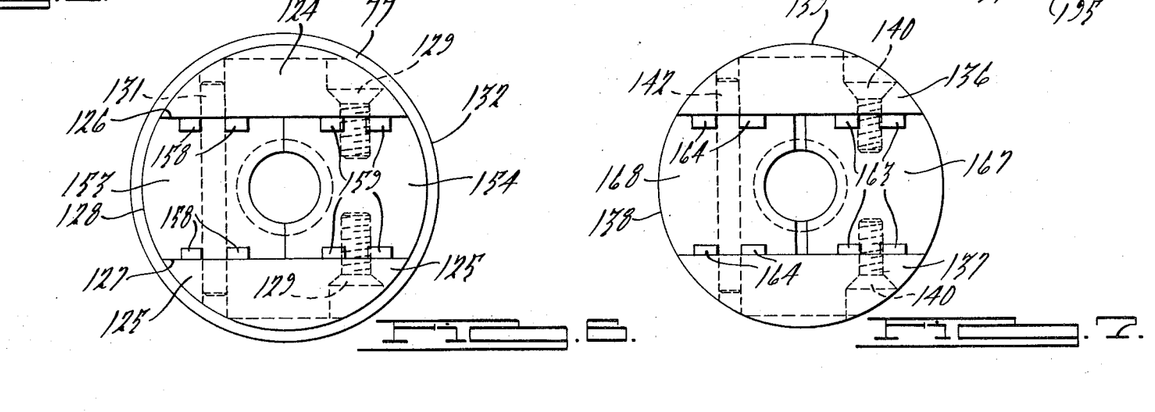
FIG. 6 is a view taken in the direction of the line 6—6 in FIG. 5 with the dies removed to more clearly show the construction.
FIG. 7 is a view taken in the direction of the line 7—7 in FIG. 5 with the dies removed to more clearly show the construction.

The dies 105 and 107 are positioned between retaining plates 124 and 125 (FIGS. 2, 5 and 6). The retaining plates 124 and 125 are clamped to flattened surfaces 126 and 127 of an extending portion 128 of the piston 77. Socket headed screws 129 and locating dowels 131 hold these elements together.

A collar 132 encircles the plates 124 and 125 and further assists in locating and retaining the plates 124 and 125 relative to the piston portion 128. The collar 132 is bored as at 133 to receive a locating dowel 134. The dowel 134 is staked into a bore 135 in the housing member projection 41. Thus, the collar is held against axial movement relative to the housing member bore 76.

The dies 106 and 108 are located between a pair of plates 136 and 137 (FIGS. 2, 5 and 7). The plates 136 and 137 are fixed to a projection 138 of a V-block member 139 by means of socket headed screws 140 and locating dowels 142. The V-block 139 has a cylindrical portion 141 that is received in a bore 142 of the housing member 19. A socket headed screw 143 extends through a bore 144 in an end wall of the housing member 19 and is threaded into a tapped hole 145 formed in the V-block 139 to axially affix the V-block 139 relative to the housing member 19.

The dies 105 and 107 have angularly disposed surfaces 151 and 152 (FIG. 3 and 5) that are engaged with corresponding angularly disposed surfaces 153 and 154 of the piston extensions 128. The piston extension 128 is, in fact, a V-block for actuating the dies 105 and 107 as will become more apparent. The upper and lower surfaces of the dies 105 and 107 are formed with inclined grooves 156 and 157. Pairs of pins 158 and 159 are affixed to each of the plates 124 and 125 and extend into the grooves 156 and 157, respectively, to locate the dies 105 and 107 relative to the assembly comprised of the plates 124 and 125 and the V-block 128. This location permits the dies 105 and 106 to move in a direction parallel to their inclined surfaces 151 and 152.

A similar arrangement is provided for locating the dies 106 and 108 relative to the V-block 139 and plates 136 and 137. This arrangement includes grooves 161 formed in the upper and lower faces of the die 106 and upper and lower grooves 162 formed in the upper and lower faces of the die 108. Pairs of pins 163 and 164 are affixed to the plates 136 and 137 and engage the grooves 161 and 162 respectively. This arrangement insures that the dies 106 and 108 are located accurately but are free to move in a direction parallel to inclined surfaces 165 and 166 of the dies 106 and 108, respectively. The inclined surfaces 165 and 166 are engaged with corresponding inclined surfaces 167 and 168 of the V-block 139.

At the adjacent termination of the die surfaces 151 and 152 the dies 105 and 106 are formed with angularly disposed surfaces 171 and 172. The angularly disposed surfaces 171 and 172 are engaged by corresponding surfaces 173 and 174 (FIG. 3) of a plunger 175. The plunger 175 is slidably supported within a counterbored passage 176 of the piston 77. A coil spring 177 bears against the plunger 172 and is loaded by an adjusting plug 178 received in a threaded opening 179 of the piston 77 to normally urge the plunger 175 to an extended position as shown in the Figures. A second plug 181 closes the outer end of the counterbore 179 and precludes the leakage of hydraulic fluid from the housing bore 76 into the piston 77.

The dies 106 and 107 also have inclined surfaces 182 and 183 that are engaged by inclined surfaces 184 and 185 of a second plunger 186. The plunger 186 is slidably supported in a counterbored opening 187 formed in the V-block 139. A coil spring 188 bears against the second plunger 186 and against a plug 189 that is threaded into the V-block 139. The spring 188 urges the plunger 186 toward a fully extended position.

A coil spring 191 encircles the piston 77 (FIG. 2). The coil spring 191 is loaded between the collar 132 and a shoulder 192 formed at the upper end of the piston 77. The spring 191 normally urges the piston 77 to an extreme righthand position until a pair of flanges 193 and 194 of the plates 124 and 125 engage the collar 132. The spring 191 exerts a force tending to oppose any hydraulic pressure in the bore 76. A sealing ring 195 is received in a groove 196 in the piston 77 to effect sealing of the bore 76.

Figure 1:
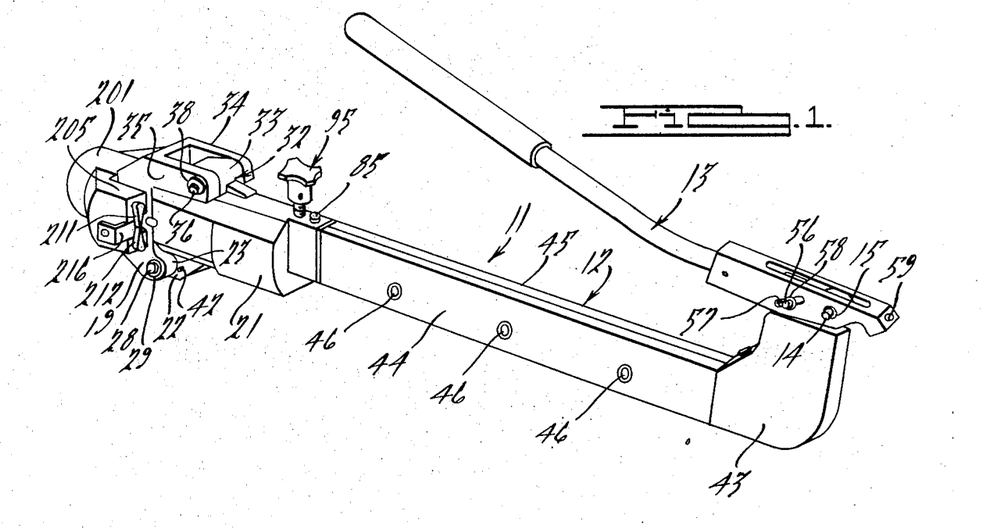
FIG. 1 is a persepctive view of a cold welding tool embodying this invention.

A gripping assembly, best shown in FIGS. 1 and 4, is provided for holding the ends of the wires to cables to be welded during the welding sequence, as will become apparent. This assembly includes a gripping finger housing, indicated generally by the reference numeral 201. The housing 201 has a cylindrical bore 202 that is slidably supported upon a cylindrical portion 203 of the housing member 19. At each side of the housing member 19, the finger housing has lugs 204 and 205 each of which have respective bores, only one of which appears at 206. A cylindrical shank 207 of respective gripping fingers 208, 209, 211 and 212 is journalled for pivotal movement in each bore 206.

The gripping fingers 208 and 209 have depending pin projections 213 and 214 that are received in a transversely extending groove 215 of a generally L-shaped release finger 216. The release finger 216 is slidably supported in a groove 217 formed in the lug 204 of the finger housing member 201. A corresponding arrangement is provided for the gripping fingers 211 and 212. For this reason, the structure associated with these fingers will not be described in detail and has been identified by the same reference numerals. A coil spring 220 is received in a bore 218 at the base of each lug and engages the release fingers 216 to urge them in an outward direction. The degree of movement in this direction is limited by the contact of one of the gripping fingers with a pin 219.

The entire gripping finger arrangement including the housing member 201 is, as has been noted, slidably supported on the housing member 19. A return spring 221 of a flat annular shape is affixed at its center to the housing member 19 by means of a bolt 222 and washer 223. The spring 221 is slotted in a generally radial direction and these fingers engage a shoulder 224 formed on the end of the finger housing member 201.

OPERATION

The drawings illustrate the mechanism with the dies 105, 106, 107 and 108 in a retracted position. In this position, the ends of wires or cables to be welded are inserted into the cavities defined by the grooves 109 and 111 and 112 and 113, respectively. This is accomplished by applying a pressure to the release fingers 216 so as to pivot the gripping fingers 208, 209, 211 and 212 in an opening direction. The wire ends are slid into abutment at the point of juncture of the mating faces of the dies 105 and 106 with the dies 107 and 108. At this time, the release fingers 216 are released and the gripping fingers 208, 209, 211 and 212 will grasp and retain the wire ends.

The release valve 95 is then moved to its closed position as shown in the Figures and the handle 13 is pumped. As has been previously noted, pivotal movement of the handle assembly 13 reciprocates the plunger 48 and causes hydraulic fluid under pressure to be delivered to the bore 76. This pressure acts upon the piston 77 in opposition to the spring 191 and causes the V-block portion 128 of the piston to approach the V-block 138. As the V-blocks move together, the inclined surfaces of these V-blocks act upon the corresponding inclined surfaces of the dies 105, 106, 107 and 108 to exert a pressure on these dies. Initially, the plungers 175 and 186 will prevent the dies 105 and 106 from moving toward the dies 107 and 108. The springs 177 and 188 exert more pressure than the initial force exerted on the motor 17. Thus, the pairs of dies 105, 106 and 107, 108, will be initially forced toward each other until their cooperating faces are in abutment. At this time, the respective ends of the wires will be gripped in their grooves.

Upon continued pumping action of the handle assembly 13, sufficient pressure will be exerted on the piston 77 to overcome the action of the springs 177 and 188 and the pairs of closed dies 105, 106, and 107, 108 will be urged toward each other. Since the wire has been gripped in these dies an upset of the ends of the wires will occur, as is well known in this art. The flash from the upset metal will be displaced into the die cavities 118.

The relief valve assembly 81 will remain in its closed position until the preset pressure is developed in the cylinder 76. At that time, the valve 81 will open so that further pumping of the piston 49 will merely transfer fluid back to the reservoir tube 88. Thus, the force exerted by the fluid motor 17 on the dies 105, 106, 107 and 108 and upon the wires gripped thereby will be limited by the pressure at which the valve 81 is set to open.

The gripping fingers 208, 209, 211 and 212 permit the wire ends to slide in an inward direction during the aforenoted procedure. It will be noted that the centers of the die cavities defined by the grooves 109, 111 and 112 and 113 move axially relative to the handle assembly. During this axial movement the entire gripping assembly slides against the action of the spring 221.

After the dies have moved completely together to finish an initial upset, the release valve 95 is opened to relieve the hydraulic pressure in the chamber 76. The spring 191 will then urge the piston 77 to its initial position and the plungers 175 and 186 will cause the dies to retract. When the dies 105, 106, 107 and 108 are retracted, the gripping fingers 208, 209, 211 and 212 will hold the joined ends of the wires against retraction along with the dies. Thus, no tensile load will be placed upon the joined wire ends. Successive upsets are then made in the manner previously described until a good weld has been provided. At that time, the latch 32 is released and the housing member 19 is pivoted to an opened position so that the welded wire ends may be removed. In addition, this opening of the housing assembly permits removal of any flash from between the die faces and permits inspection of the dies surfaces. Furthermore, if desired the dies may be conveniently removed at this time.

It should be readily apparent that the description construction may be conveniently hand held and hand operated due to the hydraulic force amplification. The dies may be conveniently removed and inspected and an extremely compact overall assembly is provided. Furthermore, the arrangement limits the force that is applied to the welding dies and to the welded workpieces. Such an arrangement also would have utility in mechanically operated machines and it is deemed with the purview of this invention to provide a corresponding structure for limiting the force applied in machines having purely mechanical die actuating arrangements.

In some instances it may be desirable to arrange the components in a different configuration. That is, it may be desirable to have the dies and their supporting housing assemblies extended at an angle to the reservoir portion of the handle mechanism. Such an arrangement may prove more satisfactory for certain applications. Such changes may be made without departing from the spirit and scope of the invention as defined by the appended claims.

We claim:

1. A hand held tool for cold pressure welding of pieces comprising a housing assembly adapted to be held in the hand of an operator, welding dies for gripping and upsetting the pieces to be welded, a handle supported for movement relative to the housing assembly and adapted to be manually moved relative thereto, force amplifying means carried by said housing assembly and operatively interposed between said handle and said welding dies for amplifying the manual force applied to said handle and for using said amplified force for moving said welding dies through a welding sequence, and means interposed between said force amplifying means and said welding dies for limiting the force applied to said welding dies by said force amplifying means.

2. A hand held tool as set forth in claim 1 wherein the force amplifying means comprises a pump operated by the handle and a hydraulic motor driven by said pump and associated with the welding dies.

3. A hand held tool as set forth in claim 2 further including a reservoir for retaining hydraulic fluid and for delivering such fluid to the pump and for receiving such fluid from the motor, said pump being normally disposed beneath said reservoir when said tool is operated.

4. A hand held tool as set forth in claim 2 wherein the force limiting means comprises a pressure relief valve interposed between the pump and the hydraulic motor for limiting the force applied by said hydraulic motor to the welding dies.

5. A hand held tool as set forth in claim 2 wherein the welding dies comprise first and second pairs of dies, the dies of said pairs being movable relative to each other from an opened position to a gripping position, the pairs of dies being movable relative to each other between an opened position and a welding position.

6. A hand held tool as set forth in claim 1 wherein the welding dies comprise first and second pairs of dies, the dies of said pairs being movable relative to each other from an opened position to a gripping position, the pairs of dies being movable relative to each other between an opened position and a welding position.

7. A cold pressure welding tool comprising first die means, second die means, a first housing member having an opening formed therein receiving and supporting said first die means, a second housing member having an opening formed therein receiving and supporting said second die means, means for moving said die means into gripping engagement with first and second pieces to be welded and for movement to upset the ends of the gripped pieces, and means for pivotally connecting said housing members together for movement between a closed position in which said die means may coact an upset and an opened position in which said die means may be removed from the respective of said housing members, said openings of said housing members forming a common cavity when the housing members are in their closed position.

8. A cold pressure welding tool as set forth in claim 7 wherein the means for moving the die means between their position includes operating means carried by at least one of the housing members.

9. A cold pressure welding tool as set forth in claim 8 wherein the means for moving the die means includes a fluid motor carried by the first housing member.

10. A cold pressure welding tool as set forth in claim 7 wherein each of the die means comprises a pair of dies, one die of each pair of dies being positioned in each of the housing members.

11. A hydraulically operated cold pressure welding apparatus comprising a first pair of dies, a second pair of dies, means for supporting the dies of said pair of dies for movement relative to each other between an opened position and a gripping position and for movement of the pairs of dies relative to each other between an opened position and a welding position, and means including a hydraulic motor for moving the dies of said pairs of dies from their opened position to their gripping position and for moving said pairs of dies from their opened position to their welding position.

12. A hydraulically operated cold pressure welding apparatus as set forth in claim 11 further including a pump for delivering hydraulic fluid under pressure to the hydraulic motor.

13. A hydraulically operated cold pressure welding apparatus as set forth in claim 12 further including a pressure relief valve interposed between the pump and the hydraulic motor for limiting the force applied by said hydraulic motor to the welding dies.

14. A hydraulically operated cold pressure welding apparatus as set forth in claim 12 wherein the pump is manually operated.

15. A hydraulically operated cold pressure welding apparatus as set forth in claim 11 wherein the hydraulic motor includes a fluid actuated piston operatively associated with the dies for operating the dies.

16. A hydraulically operated cold pressure welding apparatus as set forth in claim 15 wherein the means for operatively associating the piston with the dies includes at least one camming block operated by the piston.

17. A hydraulically operated cold pressure welding apparatus as set forth in claim 11 further including spring means for urging the dies back to their opened position.

18. A cold pressure welding apparatus comprising first, second, third and fourth dies, a first V-block juxtaposed to said first and said third dies, the inclined surfaces of said first V-block urging said first and said third dies toward each other upon movement of said first V-block relative to said first and said third dies, a second V-block juxtaposed to said second and said fourth dies, the inclined surfaces of said second V-block urging said second and said fourth dies toward each other upon movement of said second V-block relative to said second and said fourth dies, a spring biased first cam positioned at the bight of the inclined surfaces of said first V-block and interposed between said first and said third dies for urging said first and said third dies away from each other, a spring biased second cam positioned at the bight of the inclined surfaces of said second V-block and interposed between said second and said fourth dies for urging said second and said fourth dies away from each other, means for moving said first and said second V-blocks relative to each other and relative to the respective of said dies, said spring biased cams being effective to cause initial movement of said first die relative to said second die and said third die relative to said fourth die prior to movement of said first die relative to said third die and said second die relative to said fourth die, said spring biased cams being effective to yield upon engagement of said first die with said second die and upon engagement of said third die with said fourth die for movement of said first die relative to said third die and of said second die relative to said fourth die upon continued movement of said first V-block relative to said second V-block and a housing having first and second pivotally connected members in which respective cavities are formed, said first V-block and said first and third dies being positioned in the cavity of one of said members and said second V-block, said second and fourth dies being positioned in the cavity of the other member.

19. A cold pressure welding apparatus as set forth in claim 18 wherein the means for moving the first V-block relative to the second V-block includes a hydraulic piston operatively connected with one of said V-blocks.

20. A cold pressure welding apparatus as set forth in claim 19 further including a housing having first and second pivotally connected members in which respective cavities are formed, the first cam and the first and third dies being positioned in the cavity of one of said members and the second cam, the second and fourth dies and the hydraulic piston being positioned in the cavity of the other member.

21. A cold pressure welding apparatus as set forth in claim 20 further including a manually operated hydraulic pump carried by one of the housing members and adapted to deliver hydraulic fluid under pressure to the hydraulic piston.

22. A cold pressure welding apparatus as set forth in claim 21 further including a pressure relief valve interposed between the pump and the hydraulic motor for limiting the force applied by said hydraulic motor to the welding dies.

23. A cold pressure welding tool comprising first die means for gripping a first workpiece, second die means for gripping a second workpiece, a fluid motor means for moving said die means relative to each other between an opened position and a welding position for effecting an upset on the ends of the workpieces gripped by the die means, and a relief valve for limiting the force applied to said die means by fluid motor means to a predetermined value.

24. A hand held tool for cold pressure welding of pieces comprising a housing assembly adapted to be held in the hand of the operator, said housing assembly including first and second pieces and means for supporting said pieces for pivotal movement between a closed position and an opened position, said pieces having openings formed therein which openings are in registry with each other when said pieces are in their closed position, first and second pairs of welding dies for gripping and upsetting the piece to be welded, certain of said dies being supported in the opening of one of said pieces and the other of said dies being supported in the opening of the other of said pieces, a handle supported for movement relative to said housing assembly and adapted to be manually moved relative thereto, and force amplifying means carried by said housing assembly and operatively interposed between said handle and said welding dies for amplifying the manual force applied to said handle and for using said amplifying force for moving the dies of said pairs relative to each other from an open position to a gripping position and the pairs of dies relative to each other between an opened position and a welding position.

* * * * *